(12) United States Patent
Kereth

(10) Patent No.: US 10,156,288 B2
(45) Date of Patent: Dec. 18, 2018

(54) HUB PLANETARY BELT TRANSMISSION

(71) Applicant: Yefim Kereth, Rehovot (IL)

(72) Inventor: Yefim Kereth, Rehovot (IL)

( * ) Notice: Subject to any disclaimer, the term of this patent is extended or adjusted under 35 U.S.C. 154(b) by 127 days.

(21) Appl. No.: 15/127,137

(22) PCT Filed: Mar. 19, 2015

(86) PCT No.: PCT/IL2015/050291
§ 371 (c)(1),
(2) Date: Sep. 19, 2016

(87) PCT Pub. No.: WO2015/140805
PCT Pub. Date: Sep. 24, 2015

(65) Prior Publication Data
US 2017/0159787 A1    Jun. 8, 2017

(30) Foreign Application Priority Data

Mar. 20, 2014   (IL) .......................................... 231617

(51) Int. Cl.
| | |
|---|---|
| *F16H 7/02* | (2006.01) |
| *F16H 9/26* | (2006.01) |
| *B64C 27/12* | (2006.01) |
| *B64C 27/20* | (2006.01) |
| *B64D 35/06* | (2006.01) |
| *F16H 48/06* | (2006.01) |

(52) U.S. Cl.
CPC ............ *F16H 48/06* (2013.01); *B64C 27/20* (2013.01); *B64D 35/06* (2013.01); *F16H 7/02* (2013.01); *F16H 9/26* (2013.01); *B64C 2027/125* (2013.01)

(58) Field of Classification Search
CPC ... F16H 48/06; F16H 7/02; F16H 7/06; F16H 9/16; F16H 9/26; F16H 1/227; B64C 27/20; B64C 2027/125; B64D 35/06
See application file for complete search history.

(56) References Cited

U.S. PATENT DOCUMENTS

| | | | |
|---|---|---|---|
| 1,434,620 A | * | 11/1922 | McCain ................. B64D 35/06 |
| | | | 416/129 |
| 2,101,845 A | | 12/1937 | Fraser |
| 2,459,969 A | | 1/1949 | Schweickart |
| | | (Continued) | |

*Primary Examiner* — Jacob S. Scott
*Assistant Examiner* — Tinh Dang
(74) *Attorney, Agent, or Firm* — Stetina Brunda Garred and Brucker

(57) ABSTRACT

A hub planetary belt transmission (2) has a platform body (50) supporting a motor drive (8) having a motor drive shaft (6) coupled to a distributing and a collecting pulley (4, 18) attached to a first output shaft (22) coupled to a first propulsion element (40, 44). A housing (30) coupled to peripheral shafts (24) attached to tension arms (26) is concentrically rotatable about a common axis of the distributing and collecting pulleys and is coupled to a second propulsion element (42, 45). Transmitting pulleys (12, 14) are driven by distributing belts (10) and collecting belts (20) for rotating together with the peripheral shafts and tension arms about a common axis of the distributing and collecting pulleys so as to create a centripetal force which stretches the distributing belts and the collecting belts, thus regulating the coupling force between the belts and pulleys based on the rotation velocity.

10 Claims, 3 Drawing Sheets

(56) References Cited

U.S. PATENT DOCUMENTS

| | | | | |
|---|---|---|---|---|
| 2,978,208 | A * | 4/1961 | Halsmer | B64D 27/08 244/53 R |
| 3,470,961 | A * | 10/1969 | Halsmer | B64D 35/06 416/125 |
| 5,007,811 | A * | 4/1991 | Hopkins | A45B 3/00 135/16 |
| 5,074,829 | A | 12/1991 | Menge | |
| 5,586,867 | A * | 12/1996 | Mehlos | F04D 25/088 416/170 R |
| 6,406,261 | B1 * | 6/2002 | Tsunoda | B63H 7/02 415/124.2 |
| 8,876,648 | B2 | 11/2014 | Kereth | |
| 9,441,712 | B1 * | 9/2016 | Tjensvoll | F03D 15/00 |
| 2003/0213460 | A1 * | 11/2003 | Schwam | B64D 27/02 123/242 |
| 2013/0231208 | A1 * | 9/2013 | Buono | B64C 27/10 475/5 |
| 2014/0148289 | A1 * | 5/2014 | Anderson | F16H 7/023 474/150 |
| 2015/0219398 | A1 * | 8/2015 | Santoro | F28C 3/08 62/314 |

* cited by examiner

HUB PLANETARY BELT TRANSMISSION

FIELD OF THE INVENTION

This invention relates to hub planetary belt transmissions.

BACKGROUND OF THE INVENTION

A typical hub transmission is a differential transmission with an input shaft and two output shafts. All of the hub transmission elements are rotatable, driven and carried by the motor drive shaft. The differential planetary gear transmission is considered as one of the common hub transmissions; however, it relatively expensive, heavy, and it has a significant loss of efficiency (about 3% per stage). On the contrary, hub planetary belt transmission is relatively inexpensive, light, and may have significantly higher efficiency (e.g. higher than 98% efficiency for the flat belts), per reduction stage.

U.S. Pat. No. 8,876,648 in the name of the present Applicant discloses a planetary belt transmission with a motor drive having a motor drive shaft, a distributing pulley attached to the motor drive shaft and a collecting pulley attached to an output shaft. Two or more distributing belts are coupled to the distributing pulley and two or more collecting belts are coupled to the collecting pulley from mutually opposite radial directions. Four or more transmitting pulleys are arranged in two or more concentric pairs around the distributing pulley and the collecting pulley and are coupled to the distributing pulley and the collecting pulley via the distributing belts and the collecting belts, respectively. Two or more peripheral shafts support the transmitting pulleys, while allowing movement in a radial direction only relative to the output shaft and being preloaded so as to apply a net zero radial force on the distributing pulleys and the collecting pulleys in a plane perpendicular to respective axes thereof. In use the housing is restrained and the output shaft rotates.

SUMMARY OF THE INVENTION

It is therefore a broad object of the present invention to provide a hub planetary belt transmission having the properties of the planetary belt transmission described in U.S. Pat. No. 8,876,648, but wherein the transmitting pulleys and the elements attached thereto, including the housing, are rotatable and function as a second output shaft that is counter-rotatable relative to the first output shaft, thus implementing the principles of the differential planetary gear transmission, but with significantly higher efficiency and lower production costs.

This object is realized in accordance with a broad aspect of the invention by a hub planetary belt transmission having the features of claim 1.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
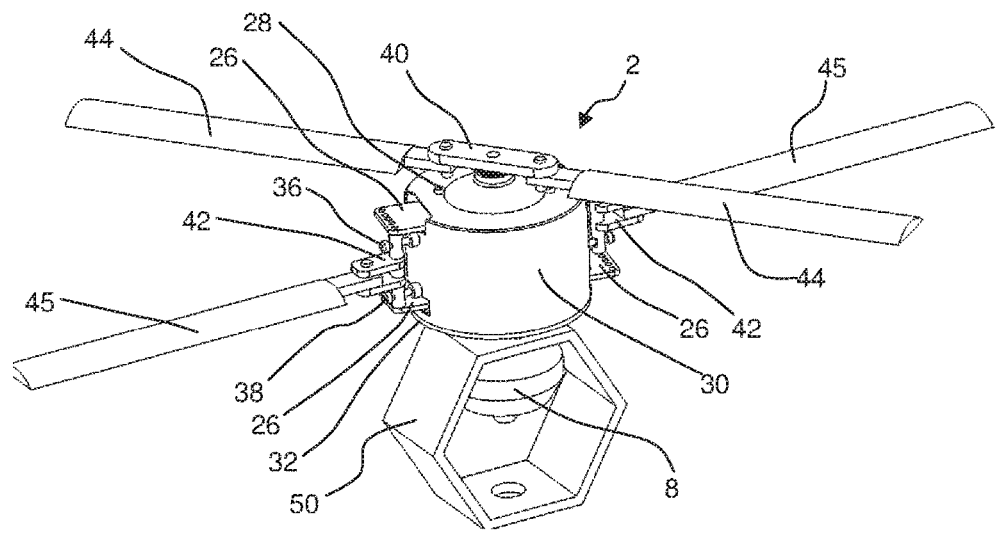
FIG. 1 is a general perspective view of a hub planetary belt transmission of "I" configuration.
Figure 2:
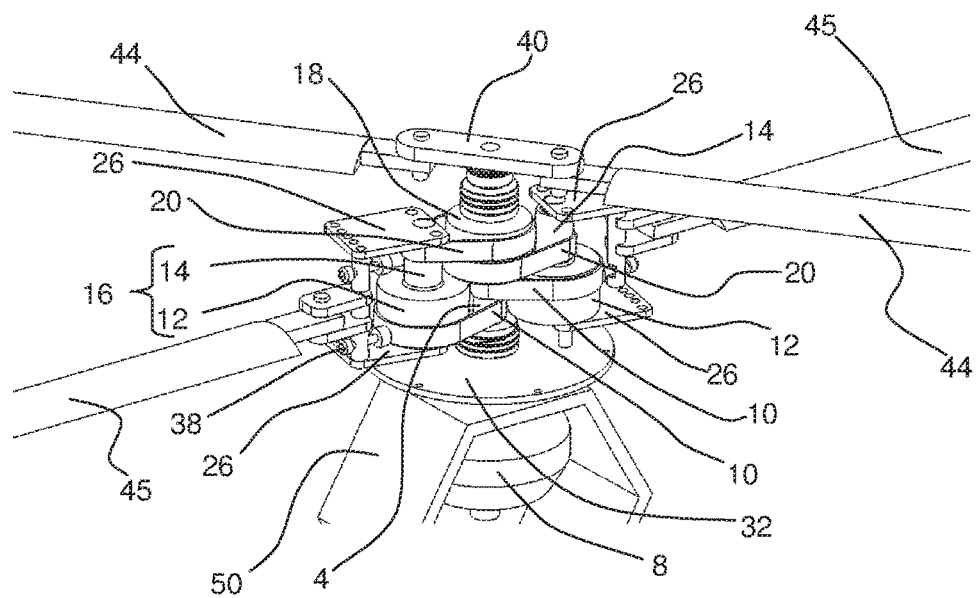
FIG. 2 is a general perspective view of a hub planetary belt transmission of "I" configuration without the transmission house.
Figure 3:
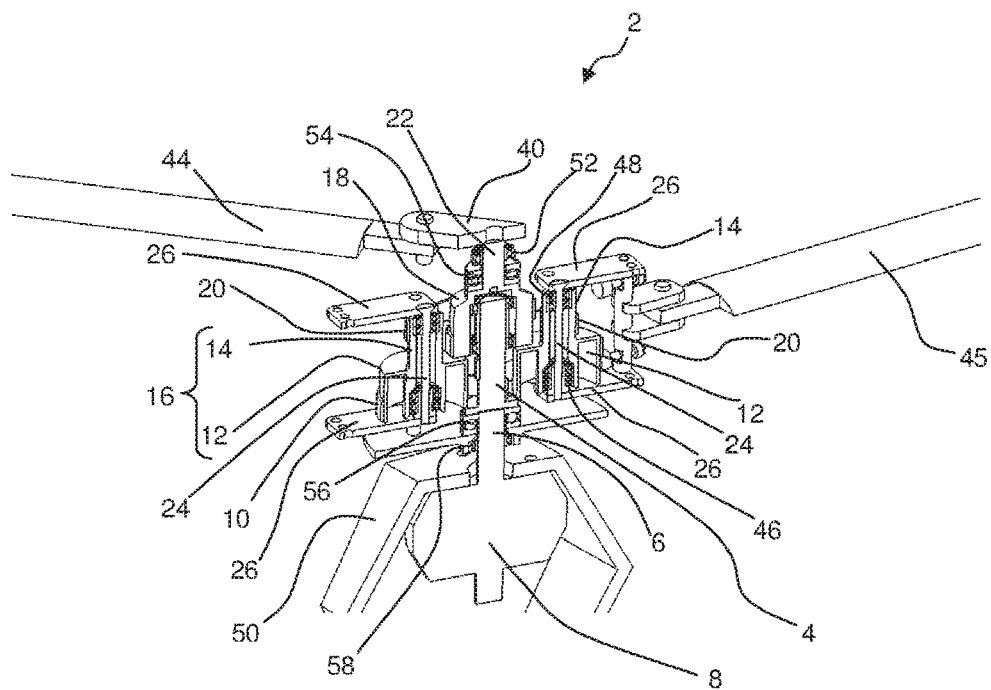
FIG. 3 is a general perspective cross-section view of a hub planetary belt transmission of "I" configuration without the transmission house.
Figure 4:
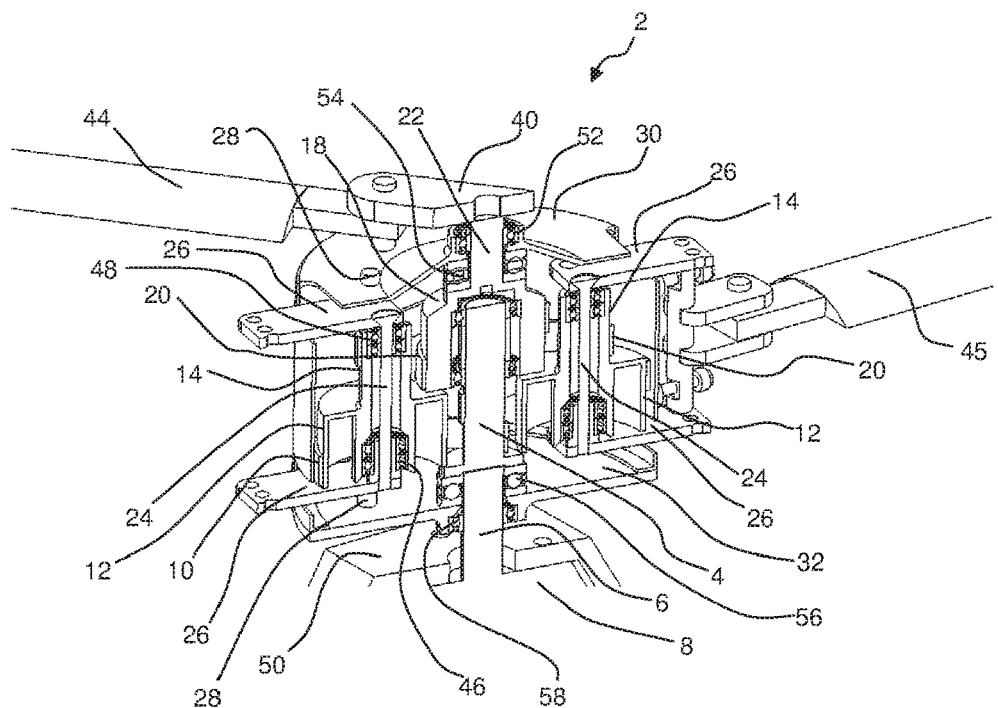
FIG. 4 is a general perspective cross-section view of a hub planetary belt transmission of "I" configuration with the transmission house.
Figure 5:
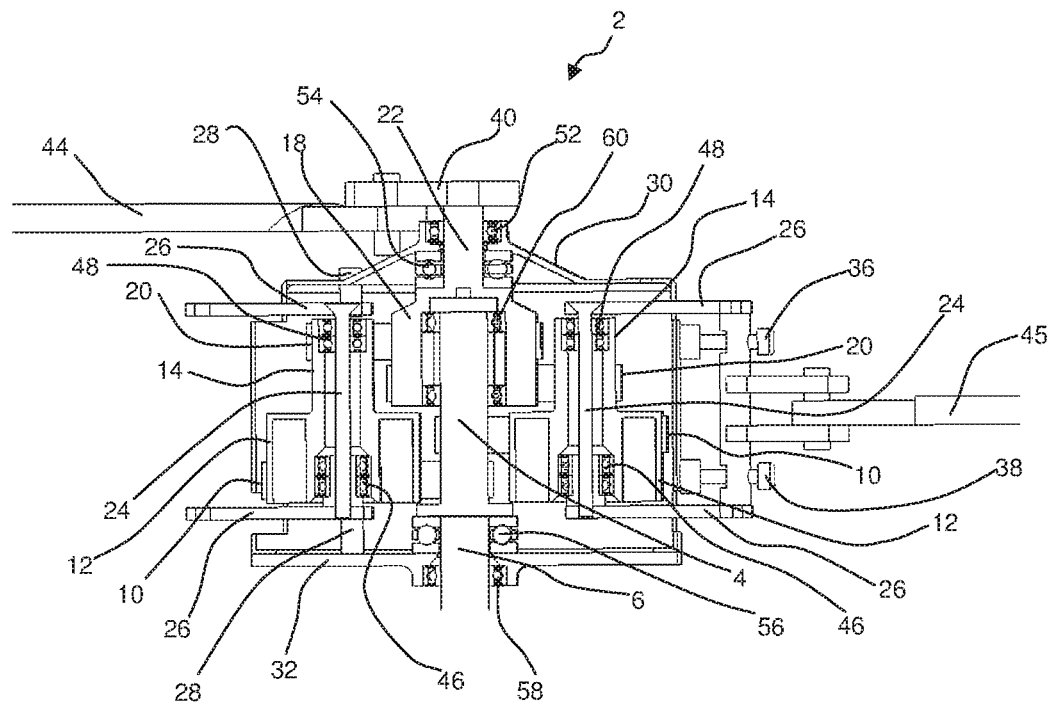
FIG. 5 is a front cross-section view of a hub planetary belt transmission of "I" configuration with the transmission house.

FIGS. 1 to 5 are detailed representations of a first embodiment of a hub planetary belt transmission of "I" configuration (two planets) shown generally as 2 driven via its distributing pulley 4 by a motor drive shaft 6 (shown in FIGS. 3 to 5) of a motor drive 8 and distributing power (torque and rotation velocity) from the motor drive 8 via hub transmission distributing belts 10 to two or more pairs of concentric transmitting pulleys 12 and 14, each pair being designated as 16, which convey power from the motor drive 8 to a collecting pulley 18 via collecting belts 20. The power collected by the collecting pulley 18 is relayed to a propeller blades carrier 40 and to first propeller blades 44 connected thereto by a first output shaft 22 attached to the collecting pulley 18. The propeller blades carrier 40 together with the first propeller blades 44 constitute a first propulsion element. Each pair 16 of transmitting pulleys 12 and 14 is commonly rotatable about a respective peripheral shaft 24, which is coupled to a respective tension arm 26. The motor drive 8 may be attached to a platform body 50 on which the propelled element is powered (e.g. aerial vehicle chassis). The tension arms 26 are rotatably coupled to respective hinges 28 in a rotatable transmission housing 30 having a cover 32.

The rotatable transmission housing 30 serves as a second output shaft that may be connected, at least indirectly via blade couplers 42, to second propeller blades 45. The thrust force of the first propeller blades 44 connected to the propeller blades carrier 40 is rotatably transferred to a platform body 50 via thrust bearings 54 and 56 and via the drive shaft 6. The transmission housing 30 and its cover 32 are rotatably carried on the first output shaft 22 and on the drive shaft 6, respectively, by respective bearings 52 and 58 and transfer via the drive shaft 6 and the thrust bearing 56 the thrust force of the second propeller blades 45 connected to the blade couplers 42 (FIG. 1) to the platform body 50.

The concentric pairs 16 of transmitting pulleys 12 and 14 are driven by the distributing belts 10 so as to rotate about the common axis of the distributing and the collecting pulleys 4 and 18 in a direction opposite to the direction of the rotation of the distributing and the collecting pulleys 4 and 18. While rotating, the concentric pairs 16 of transmitting pulleys 12 and 14 rotate the peripheral shafts 24, the ball bearings 46 and 48 and the tension arms 26 about the common axis of the distributing and the collecting pulleys 4 and 18 and create a centripetal force which stretches the distributing belts 10 and the collecting belts 20, thus regulating the coupling force between the distributing belts 10 and collecting belts 20, the transmitting pulleys 12 and 14, and the distributing and collecting pulleys 4 and 18.

The centripetal force created by the rotation of the concentric pairs 16 of transmitting pulleys 12 and 14, the peripheral shafts 24, ball bearings 46 and 48, tension arms 26 and blades couplers 42 will increase with the increasing rotational velocity of these elements about the common axis of the distributing and the collecting pulleys 4 and 18. The energy losses of the hub planetary transmission 2 are generated, mainly, by frictional losses associated with the ball bearings 46 and 48 of the concentric pairs 16 of transmitting pulleys 12 and 14 and with the ball bearings 60 of the collecting pulley 18. The higher the tension of the belts 10 and 20, the higher the energy losses generated by the ball bearings 46, 48 and 60. This feature allows regulating the energy losses of the hub planetary transmission 2 to match the thrust force requirements from the first and second propeller blades 44, 45. When there is a demand for additional thrust force, the rotational velocity of the concentric pairs 16 of transmitting pulleys 12 and 14 and the elements attached thereto will increase with the increase in the rotational velocity of the second propeller blades 45, and therefore the tension force in the belts 10 and 20 likewise be increased to enable transmitting higher torque. Because of the centripetal force, the tension in the belts 10 and 20 can be automatically regulated based on the rotation velocity of the second propeller blades 45 coupled to the blade couplers 42. This feature allows, on the one hand, reducing the hub planetary transmission 2 energy losses, and on the other hand allows maintaining the coupling forces of the belts 10 and 20 at the right level to transmit the required torque without slippage.

The reaction of the torque transferred to the first propulsion element constituted by the propeller blades carrier 40 and the first propeller blades 44 via the first output shaft 22 rotates the concentric pairs 16 of transmitting pulleys 12 and 14 and the transmission housing 30 at least indirectly attached thereto, which operates as a second output shaft, as well as its cover 32, and the blade couplers 42 and second propeller blades 45 connected thereto, in an opposite direction. The blade couplers 42 and the second propeller blades 45 connected thereto together constitute a second propulsion element.

The blade couplers 42 are at least indirectly connected to the housing 30, via the tension arms 26. The drive shaft 6, the first output shaft 22, and the second output shaft (constituted by the transmission housing 30 and/or its cover 32) are concentric. The tension arms 26 constrain the peripheral shafts 24 to move radially along the tension arms 26 about the hinges 28, i.e. generally in a radial direction relative to a central line defined by the axis of the drive shaft 6. Preload elements 36 and 38 (shown in FIGS. 1 and 2), which may be bolts and/or springs, urge the shaft 24 in the radial direction, and create appropriate tension in the distributing belts 10 and collecting belts 20. The preload force of the preload elements 36 and 38 is adjusted such that the net force created by all the preload elements 36 and 38 on the distributing pulley 4 and on the collecting pulley 18 approaches zero.

The first propeller blades 44 coupled to the propeller blades carrier 40 are driven in a first direction by the first output shaft 22. The second propeller blades 45 coupled to the blade couplers 42 are driven by the second output shaft, constituted by the concentric pairs 16 of transmitting pulleys 12 and 14 and the transmission housing 30 at least indirectly attached thereto, to rotate in an opposite direction and create a contra-rotation, typical to the hub transmission. Bearings 46 and 48 allow the pairs of pulleys 16 to rotate about the shaft 24 under significant tension forces of the belts 10 and 20.

There are two basic configurations for connecting the blade couplers 42 to the hub planetary belt transmission 2. These two configurations result in different power losses in the transmission, as they differently affect the friction torque of the bearings, which constitutes the main factor for the power loss in belt transmissions. In the first configuration, the blade couplers 42 are connected directly to the transmission housing 30 or to it cover 32, rather than via the tension arms 26 (this configuration is not shown). In this configuration the centripetal force created by the rotation of the concentric pairs 16 of transmitting pulleys 12 and 14, the peripheral shafts 24, ball bearings 46 and 48, tension arms 26 and blade couplers 42 will increase with the increasing rotational velocity of these elements about the common axis of the distributing and the collecting pulleys 4 and 18 and therefore the preload force of the elements 36 and 38 should initially be set to such a level as to satisfy the highest expected propulsion torque and in order to assure an appropriate tension in the belts 10 and 20 and thereby prevent slippage between the belts 10 and 20 and the pulleys 4, 12, 14, and 18. In the first configuration the power loss in the transmission 2 will increase with the increase in the second output shaft rotation velocity. In the second configuration, the blade couplers 42 are connected to the transmission housing 30 and its cover 32 via the tension arms 26 (as shown in the FIGS. 1 to 5). In this configuration, the preload force of the elements 36 and 38 can be dramatically reduced, and the average power loss of the transmission 2 can be reduced accordingly, because of the additional centripetal force created by the second propeller blades 45 that increases the tension of the belts 10 and 20 via the blade couplers 42 and the tension arms 26.

In general, the torque required for propulsion of the propeller blades 44, 45 is proportional to the square of the rotation velocity of the blades 44, 45. In order to avoid slippage between the belts 10 and 20 and the pulleys 4, 12, 14, and 18, the tension of the belts 10 and 20 should increase as the propulsion torque increases. On the other hand, it is well known that the centripetal force of the second propeller blades 45 and/or of concentric pairs 16 of transmitting pulleys 12 and 14 and elements attached thereto is also proportional to the square of rotation velocity of the blades 44, 45. These facts allow implementation of a self-adjustable tension mechanism for the belts 10 and 20 simply by utilizing the centripetal force of the second propeller blades 45 at least indirectly connected to the tension arms 26 and/or of the concentric pairs 16 of transmitting pulleys 12 and 14 and elements attached thereto. Because of the self-adjustability, the initial tension of the belts 10 and 20 can be set to a minimum, by adjustment of the preload elements 36 and 38, as the tension of the belts 10 and 20 will automatically increase with the increase in rotation velocity of the second propeller blades 45 driven by the second output shaft. The self-adjustability of the tension will reduce the power loss throughout most of the range of the rotation velocities and therefore will significantly increase the coefficient of efficiency of the transmission.

Another significant property achieved because of the self-adjustability is a safety level of the propulsion system in the event that the propeller blades 44, 45 hit an obstacle. During the crash, the rotation velocity of the propeller blades 44, 45 will drop and the propulsion torque transferred via the hub planetary belt transmission 2 will be limited by the tension level of the belts 10 and 20, which is instantly reduced by the drop of the rotation velocity of the second propeller blades 45 and of the second output shaft.

Bearings 46 and 48, that allow the pairs of pulleys 16 to rotate about the shaft 24, may be of low capacity as they carry only 50% of the load in the "T" configuration (two belt planets/pulley pairs 16) and 33% or 25% of the load in "Y"

(three belt planets/pulley pairs 16—not shown) or "X" (four belt planets/pulley pairs 16 not shown) configurations, correspondently.

The belt planet is defined by all the elements in the same radial direction (except the distributing and collecting pulleys 4 and 18), namely:
 a) distributing and collecting belts 10 and 20;
 b) pairs of transmitting pulleys 16 (pulleys 12 and 14);
 c) peripheral shaft 24;
 d) bearings 46 and 48;
 e) preload elements 36 and 38;
 f) tension arms 26 that supports the abovementioned elements.

The "Y" and "X" configurations are defined by the number of the belt planets. The "I" configuration (shown in FIGS. 1 to 5) is defined by two belt planets, the "Y" configuration (not shown) is defined by three belt planets and the "X" configuration (not shown) is defined by four belt planets. Other configurations, with a higher number of the belt planets, are possible, and can be implemented based on the embodiment described above.

The basic transmission ratio of the transmission of the FIGS. 1 to 6 when the second output shaft is locked may be calculated based on the pitch diameters, in the following way:

$$\left(\frac{D_c}{D_{14}}\right) \times \left(\frac{D_{12}}{D_d}\right) = \text{transmission ratio}$$

wherein:
 $D_c$—pitch diameter of the collecting pulley 18
 $D_{14}$—pitch diameter of the transmitting pulley 14
 $D_{12}$—pitch diameter of the transmitting pulley 12
 $D_d$—pitch diameter of the distributing pulley 4

With reference to the belt planetary transmission of the "I" configuration (FIGS. 1 to 6) the transmission ratio is calculated based on the following pitch diameters:
 $D_c$=36 mm
 $D_{14}$=15.3 mm
 $D_{12}$=38 mm
 $D_d$=12 mm The transmission ratio will be 7.45.

Figure 6:
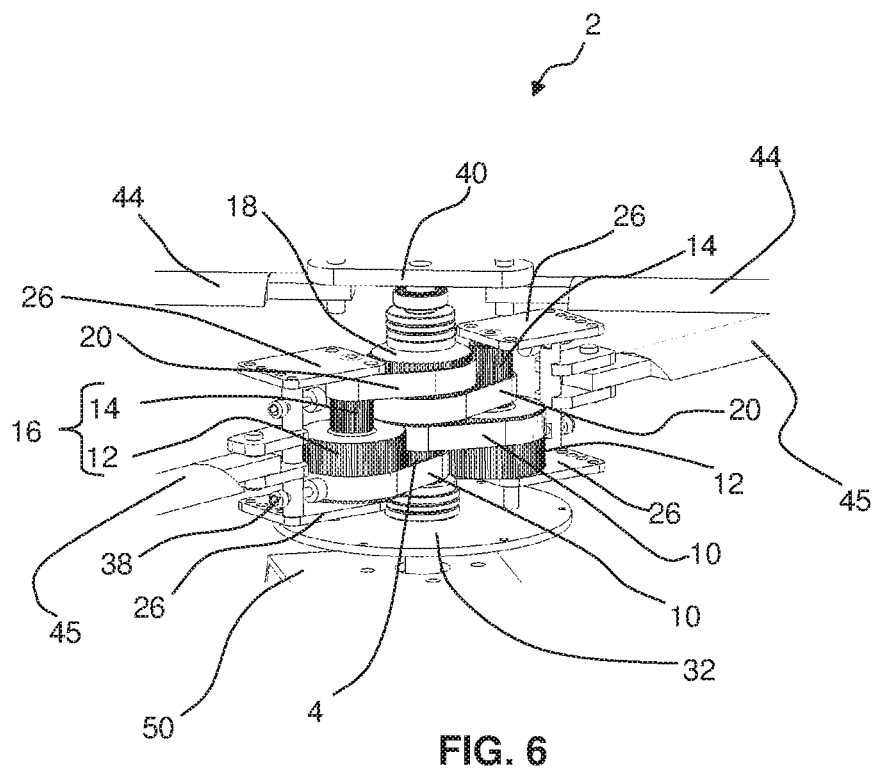
FIG. 6 is a detailed perspective view of a hub planetary belt transmission having teeth coupling pulleys and belts according to alternatives embodiments.

Although, for the sake of simplicity of the drawings, the pulleys and the belts in the figures are of the friction coupling, flat type, as shown in FIGS. 1 to 5, in all the embodiments as described, the belts and the pulleys can be of any other friction coupling (e.g. V-belts, O-belts) or teeth-coupling (e.g. timing belts) type, as shown in FIG. 6.

It will be appreciated that although the hub planetary belt transmission has been described with specific reference to aerial vehicle propulsion, this is by way of non-limiting example only and the hub planetary belt transmission according to the invention may be used in other configurations or applications. Likewise, while in the embodiments described above the hub planetary belt transmission has a single stage reduction ratio, in other applications the hub planetary belt transmission may have multi-stage reduction.

The invention claimed is:

1. A hub planetary belt transmission, comprising:
 a platform body supporting a motor drive having a motor drive shaft;
 a distributing pulley at least indirectly attached to the motor drive shaft;
 a collecting pulley attached to a first output shaft;
 said first output shaft being at least indirectly connected to a first propulsion element;
 two or more distributing belts coupled to the distributing pulley from mutually opposite radial directions;
 two or more collecting belts coupled to the collecting pulley from mutually opposite radial directions;
 four or more transmitting pulleys arranged in two or more concentric pairs located around the distributing pulley and the collecting pulley and coupled to the distributing pulley and the collecting pulley via the distributing belts and the collecting belts, respectively;
 two or more peripheral shafts supporting said two or more pairs of transmitting pulleys by ball bearings, and coupled to two or more tension arms;
 said concentric pairs of transmitting pulleys being driven by the distributing belts for rotating together with said peripheral shafts, said ball bearings and said tension arms about a common axis of the distributing and the collecting pulleys so that when thus driven the transmitting pulleys create a centripetal force which stretches the distributing belts and the collecting belts, thus regulating the coupling force between said belts and said pulleys based on the rotation velocity, and
 a hub planetary belt transmission housing concentrically rotatable about said common axis of the distributing and the collecting pulleys, said housing being at least indirectly attached to the peripheral shafts and constituting a second output shaft at least indirectly connected to a second propulsion element.

2. The hub planetary belt transmission according to claim 1, wherein:
 the first propulsion element includes a propeller blades carrier having first propeller blades attached thereto for rotating in a first direction; and
 the second propulsion element includes a blade coupler having second propeller blades attached thereto for rotating in a second direction opposite to the first direction.

3. The hub planetary belt transmission according to claim 2, wherein the tension arms are at least indirectly connected to the propeller blades to utilize centripetal force exerted by the second propeller blades to control the tension in the distributing belts and the collecting belts.

4. The hub planetary belt transmission according to claim 1, wherein the housing has at least two hinges supporting tension arms so as to allow the peripheral shafts to apply tension to the distributing belts and the collecting belts in a radial direction.

5. The hub planetary belt transmission according to claim 1, wherein the peripheral shafts are initially preloaded in a radial direction by two or more preload elements that are configured to stretch the distributing belts and the collecting belts via the pairs of transmitting pulleys so as to apply a net radial force approaching zero on to the distributing pulleys and the collecting pulleys in a plane perpendicular to respective axes of said pulleys.

6. The hub planetary belt transmission according to claim 2, wherein the housing has at least two hinges supporting tension arms so as to allow the peripheral shafts to apply tension to the distributing belts and the collecting belts in a radial direction.

7. The hub planetary belt transmission according to claim 2, wherein the peripheral shafts are initially preloaded in a radial direction by two or more preload elements that are configured to stretch the distributing belts and the collecting belts via the pairs of transmitting pulleys so as to apply a net radial force approaching zero on to the distributing pulleys and the collecting pulleys in a plane perpendicular to respective axes of said pulleys.

8. The hub planetary belt transmission according to claim 3, wherein the housing has at least two hinges supporting tension arms so as to allow the peripheral shafts to apply tension to the distributing belts and the collecting belts in a radial direction.

9. The hub planetary belt transmission according to claim 3, wherein the peripheral shafts are initially preloaded in a radial direction by two or more preload elements that are configured to stretch the distributing belts and the collecting belts via the pairs of transmitting pulleys so as to apply a net radial force approaching zero on to the distributing pulleys and the collecting pulleys in a plane perpendicular to respective axes of said pulleys.

10. The hub planetary belt transmission according to claim 4, wherein the peripheral shafts are initially preloaded in a radial direction by two or more preload elements that are configured to stretch the distributing belts and the collecting belts via the pairs of transmitting pulleys so as to apply a net radial force approaching zero on to the distributing pulleys and the collecting pulleys in a plane perpendicular to respective axes of said pulleys.

* * * * *